US011700242B2

(12) United States Patent
Darby (10) Patent No.: US 11,700,242 B2
(45) Date of Patent: Jul. 11, 2023

(54) SYSTEMS AND METHODS FOR GENERATING SECURE SIGNALS BASED ON INTERNET OF THINGS DEVICE SIGNALS

(71) Applicant: Verizon Patent and Licensing Inc., Basking Ridge, NJ (US)

(72) Inventor: Robin Darby, Erie, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/447,874

(22) Filed: Sep. 16, 2021

(65) Prior Publication Data
US 2023/0083129 A1 Mar. 16, 2023

(51) Int. Cl.
*H04L 9/40* (2022.01)
(52) U.S. Cl.
CPC .............................. *H04L 63/0428* (2013.01)
(58) Field of Classification Search
CPC .................................................. H04L 63/0428
USPC .......................................................... 726/26
See application file for complete search history.

(56) References Cited

U.S. PATENT DOCUMENTS

| 8,763,140 B2 * | 6/2014 | Marcus ................ G06Q 10/107 709/227 |
| 10,169,604 B2 * | 1/2019 | Ananthapur Bache .................... G06F 21/6218 |
| 10,171,499 B2 * | 1/2019 | Kumar .................... H04L 67/12 |
| 11,075,959 B2 * | 7/2021 | Treat ..................... H04L 63/306 |
| 11,463,439 B2 * | 10/2022 | Ellingson ................ G06F 21/44 |
| 2014/0075567 A1 * | 3/2014 | Raleigh ................... H04L 12/14 726/26 |
| 2014/0171856 A1 * | 6/2014 | McLaughlin ....... A61M 5/1723 705/14.58 |
| 2014/0325666 A1 * | 10/2014 | Gkoulalas-Divanis ...................... G06F 21/60 726/26 |
| 2015/0186653 A1 * | 7/2015 | Gkoulalas-Divanis ...................... G06F 21/60 726/26 |
| 2016/0375793 A1 * | 12/2016 | Sikand ...................... B60L 3/00 701/22 |
| 2020/0067927 A1 * | 2/2020 | Ellingson ................ G06F 21/76 |
| 2021/0266346 A1 * | 8/2021 | Gordon ................. H04L 63/166 |

OTHER PUBLICATIONS

"OMG Data Distribution Service (DDS)," Website: https://www.omg.org/spec/DDS/1.4/About-DDS/, Apr. 2015, 180 Pages.

(Continued)

*Primary Examiner* — Amare F Tabor (57) ABSTRACT

A device may receive a secure signal message from an IoT device provided in a first security zone, and may provide the secure signal message from the first security zone to a second security zone, via a first secure data layer. The device may generate two processed secure signal messages from the secure signal message, and may provide the two processed secure signal messages from the second security zone to a third security zone, via a second secure data layer. The device may calculate a secure analytics message, that includes a graph, based on the two processed secure signal messages, and may provide the secure analytics message from the third security zone to a fourth security zone, via a third secure data layer. The device may store the secure analytics message in a data structure associated with the fourth security zone.

20 Claims, 8 Drawing Sheets

(56) References Cited

OTHER PUBLICATIONS

RTI—The Largest Software Framework Provider for Autonomous Systems, Website: https://www.rti.com/en/, Obtained Sep. 16, 2021, 1 Page.
Open Geospatial Consortium, Website: http://www.indoorgml.net/, Aug. 23, 2016, 92 Pages.

* cited by examiner

SYSTEMS AND METHODS FOR GENERATING SECURE SIGNALS BASED ON INTERNET OF THINGS DEVICE SIGNALS

BACKGROUND

The Internet of things (IoT) describes a network of physical objects (e.g., devices, things, and/or the like) that are embedded with sensors, software, and other technologies for the purpose of connecting and exchanging data with other devices and systems over a network, such as the Internet. A digital twin refers to a system that is capable of ingesting signal data from a variety of IoT devices and mapping those signals to the physical world. For example, on a factory floor, a temperature of a boiler is monitored and sent to a digital twin. The digital twin may associate the temperature data with an exact location of the boiler, may enable that the temperature data of the boiler may be visualized in a heatmap chart with temperature data of other boilers.

DETAILED DESCRIPTION OF PREFERRED EMBODIMENTS

The following detailed description of example implementations refers to the accompanying drawings. The same reference numbers in different drawings may identify the same or similar elements.

A system may ingest signals from IoT devices and may map the signals to a physical world. For example, temperature data of boilers in a factory may be monitored by an IoT device (e.g., a sensor) and provided to the system. The system may associate the temperature data with exact locations of the boilers and may utilize the temperature data for analytics (e.g., providing the temperatures of the boilers in the factory as a heatmap chart). The system may also perform one or more actions based on the signals. For example, if a boiler temperature reaches a predefined threshold, the system may lower the temperature of the boiler by adjusting fuel input to the boiler or by powering off the boiler. One current system collects, processes, and performs analytics on the signals from the IoT devices. However, such a system may be external to the IoT devices (e.g., outside a factory where the IoT devices are located) and utilizing the system to control the IoT devices within the factory may create a data security risk. Another current system is provided on-premises (e.g., in the factory) and may control the IoT devices without a data security risk. However, such a system may not enable analytics of the large amounts of data produced by the IoT devices.

Thus, current systems for handling signals from IoT devices consume computing resources (e.g., processing resources, memory resources, communication resources, and/or the like), networking resources, and/or other resources associated with exposing sensitive data to security risks, handling security breaches associated with sensitive data, recovering sensitive data lost in security breaches, losing opportunities that data analytics provide for improving processes, and/or the like.

Some implementations described herein provide a security system that generates secure signals based on IoT device signals. For example, the security system may receive a secure signal message from an IoT device provided in a first security zone, and may provide the secure signal message from the first security zone to a second security zone, via a first secure data layer. The security system may generate two processed secure signal messages from the secure signal message, and may provide the two processed secure signal messages from the second security zone to a third security zone, via a second secure data layer. The security system may calculate a secure analytics message, that includes a graph, based on the two processed secure signal messages, and may provide the secure analytics message from the third security zone to a fourth security zone, via a third secure data layer. The security system may store the secure analytics message in a data structure associated with the fourth security zone.

In this way, the security system generates secure signals based on IoT device signals. For example, the security system may securely handle IoT device signals in accordance with a security standard (e.g., an International Electrotechnical Commission (IEC)-62443 cybersecurity standard) and may enable control of and data collection from the IoT devices in near real-time. The security system may collect signal data of any type from the IoT devices and may create a data structure for storing the signal data for analytical processing. The security system may provide a layered, event-driven system design that includes security zones bounded by secure devices (e.g., firewall devices). Thus, the security system may conserve computing resources, networking resources, and/or other resources that would have otherwise been consumed by exposing sensitive data to security risks, handling security breaches associated with sensitive data, recovering sensitive data lost in security breaches, losing opportunities that data analytics provide for improving processes, and/or the like.

FIGS. 1A-1E are diagrams of an example 100 associated with generating secure signals based on IoT device signals. As shown in FIGS. 1A-1E, example 100 includes IoT devices 105 associated with a security system 110. The security system 110 may utilize domain distribution service (DDS) domains to create security zones and to provide point-to-point mutual authentication between domain participants. The domain participants may communicate via one or more domains, and data of the domain participants may be tightly contracted by a DDS object. The data may be encrypted in transit and in storage. The security system 110 may follow a particular cybersecurity standard (e.g., the IEC-62443 cybersecurity standard), but may permit signal device interaction and data collection in near real-time. Some cybersecurity standard enable the security system 110 to provide a layered, event-driven design. The security system 110 may be divided into security zones that are bound by secure conduits (e.g., firewall devices). Thus, the security system 110 may provide a secure (e.g., via encryption, secure conduits, and/or the like) mechanism to collect and analyze data from the IoT devices 105 located remotely from or external to the security system 110. Further details of the IoT devices 105 and the security system 110 are provided elsewhere herein.

Figure 1A:
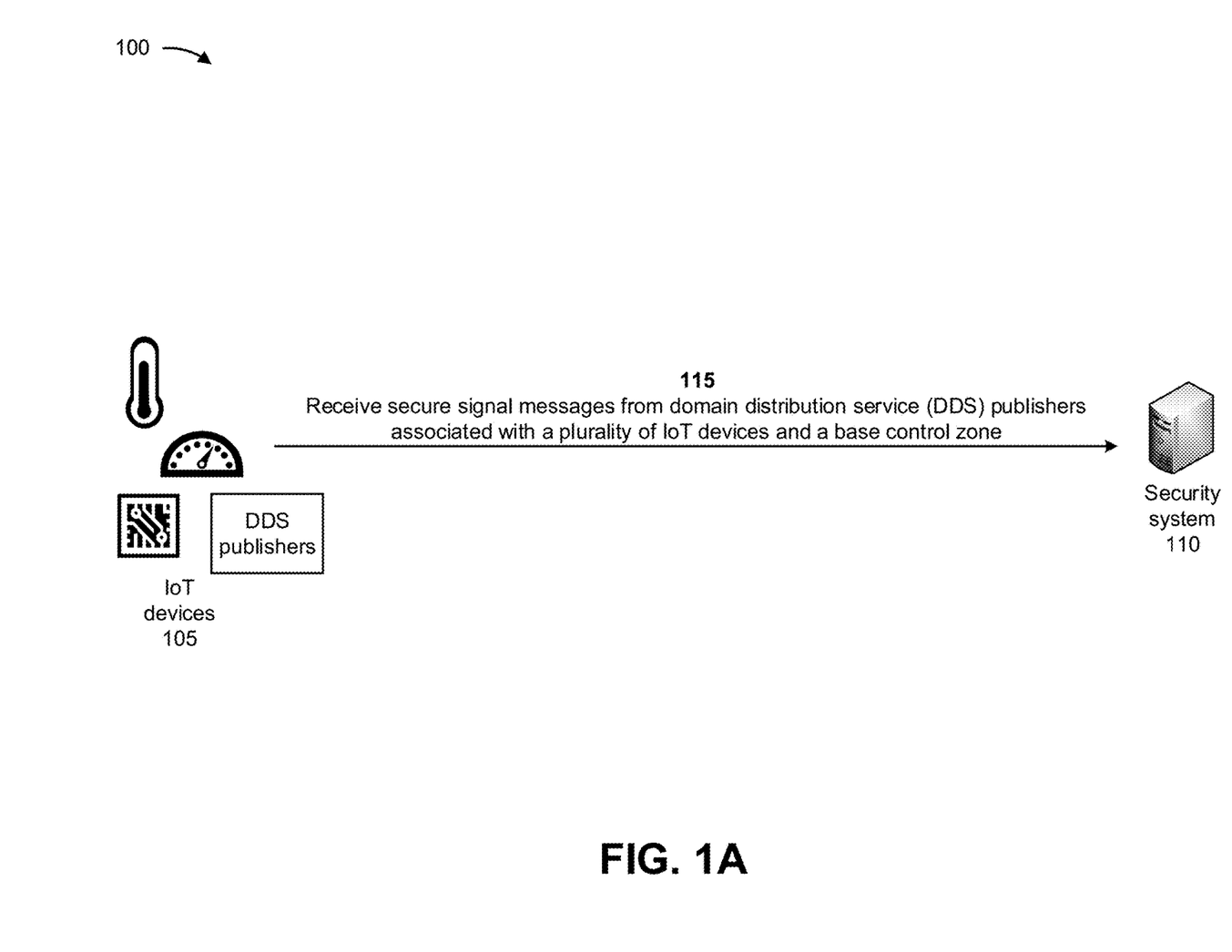
FIGS. 1A-1E are diagrams of an example associated with generating secure signals based on IoT device signals in accordance with embodiments described herein.

As shown in FIG. 1A, and by reference number 115, the security system 110 may receive secure signal messages from DDS publishers associated with a plurality of IoT devices 105 and a base control zone. For example, the IoT devices 105 may be located in the base control zone (e.g., a first security zone or level zero of the cybersecurity standard). The base control zone may be reserved for devices that produce signal data, such as the IoT devices 105. The IoT devices 105 may provide signal messages (e.g., sensor readings, temperature readings, video, images, audio, and/or the like) to the DDS publishers. The DDS publishers may be incorporated within the IoT devices 105 or may be separate from the IoT devices 105. The DDS publishers may convert the signal messages into a DDS type (e.g., defined by an interface definition language (IDL)) to generate the secure signal messages. The DDS publishers may provide the secure signal messages to the security system 110, and the security system 110 may receive the secure signal messages from the DDS publishers.

Figure 1B:
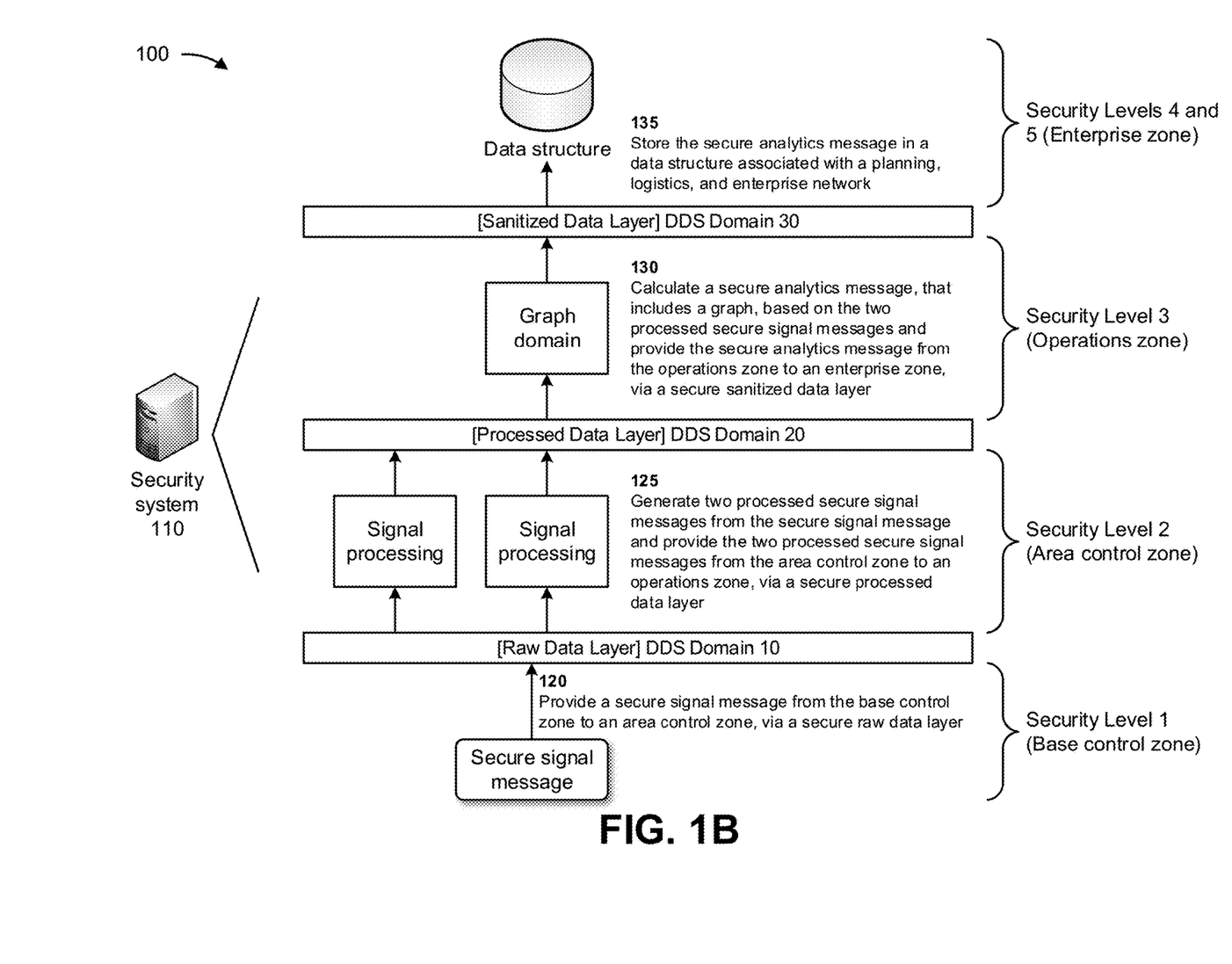

As shown in FIG. 1B, and by reference number 120, the security system 110 may provide a secure signal message from the base control zone to an area control zone via a secure raw data layer. For example, the security system 110 may provide a secure signal message, of the secure signal messages received from the DDS publishers, from the base control zone to the area control zone (e.g., a second security zone or level one of the cybersecurity standard) via the secure raw data layer (e.g., a first secure data layer). The area control zone is responsible for processing the secure signal messages received from the base control zone. The area control zone may include two or more identical signal processing components for each signal type received from the base control zone. The two or more signal processing components enable fallback redundancy if one signal processing component fails.

As further shown in FIG. 1B, and by reference number 125, the security system 110 may generate two processed secure signal messages from the secure signal message and may provide the two processed secure signal messages from the area control zone to an operations zone via a secure processed data layer. For example, the signal processing components may process the secure signal message, by encoding the secure signal message in a new DDS data type, to generate the two processed secure signal messages. The signal processing components may provide the two processed secure signal messages from the area control zone to the operations zone (e.g., a third security zone or level two of the cybersecurity standard) via the secure processed data layer (e.g., a second secure data layer). The operations zone may include a graph domain, which is an event-driven microservice with a graph database storage engine, that generates a graph based on the two processed secure signal messages.

As further shown in FIG. 1B, and by reference number 130, the security system 110 may calculate a secure analytics message, that includes a graph, based on the two processed secure signal messages and may provide the secure analytics message from the operations zone to an enterprise zone via a secure sanitized data layer. For example, the graph domain may read the two processed secure signal messages, and may map the two processed secure signal messages to a predefined facility map modeled as graph nodes and edges, to calculate the secure analytics message with the graph. The graph may be generated via an extension to a particular specification (e.g., an IndoorGML specification) that models physical spaces, objects, and abstract signal data as spaces and states. The extension to the IndoorGML specification may enable the graph domain to map a physical geometry to three-dimensional (3D) voxels (e.g., collections of 3D points in space and time). The graph domain may model space and state information of the two processed secure signal messages into the secure analytics message. The graph domain may provide the secure analytics message from the operations zone to the enterprise zone (e.g., a fourth security zone or levels four and five of the cybersecurity standard) via the secure sanitized data layer (e.g., a third secure data layer). The enterprise zone may be responsible for storing the secure analytics message in a secure data structure (e.g., a database, a list, a table, and/or the like).

As further shown in FIG. 1B, and by reference number 135, the security system 110 may store the secure analytics message in a data structure associated with a planning, logistics, and enterprise network. For example, the security system 110 may be associated with a secure data structure of an entity (e.g., a manufacturer, a government agency, and/or the like) responsible for the IoT devices 105 or the monitoring of the IoT devices 105. The secure data structure may be associated with a planning, logistics, and enterprise network of the entity. The enterprise zone may also be associated with the secure data structure. The third secure data layer of the security system 110 may write the secure analytics message to the secure data structure so that the secure analytics message may be securely stored and utilized by the entity (e.g., for planning, logistics, and/or the like).

In some implementations, each of the security zones and secure data layers of the security system 110 may be containerized via a set of platform-as-a-service products that use operating system-level virtualization to deliver software in packages called containers, (e.g., docker), so that the security system 110 may be portable between a cloud-based system and on-premises server devices. To enable receipt and utilization of external data, the security system 110 may include a first extension (e.g., described below in connection with FIG. 1C) and/or a second extension (e.g., described below in connection with FIGS. 1D and 1E).

Figure 1C:
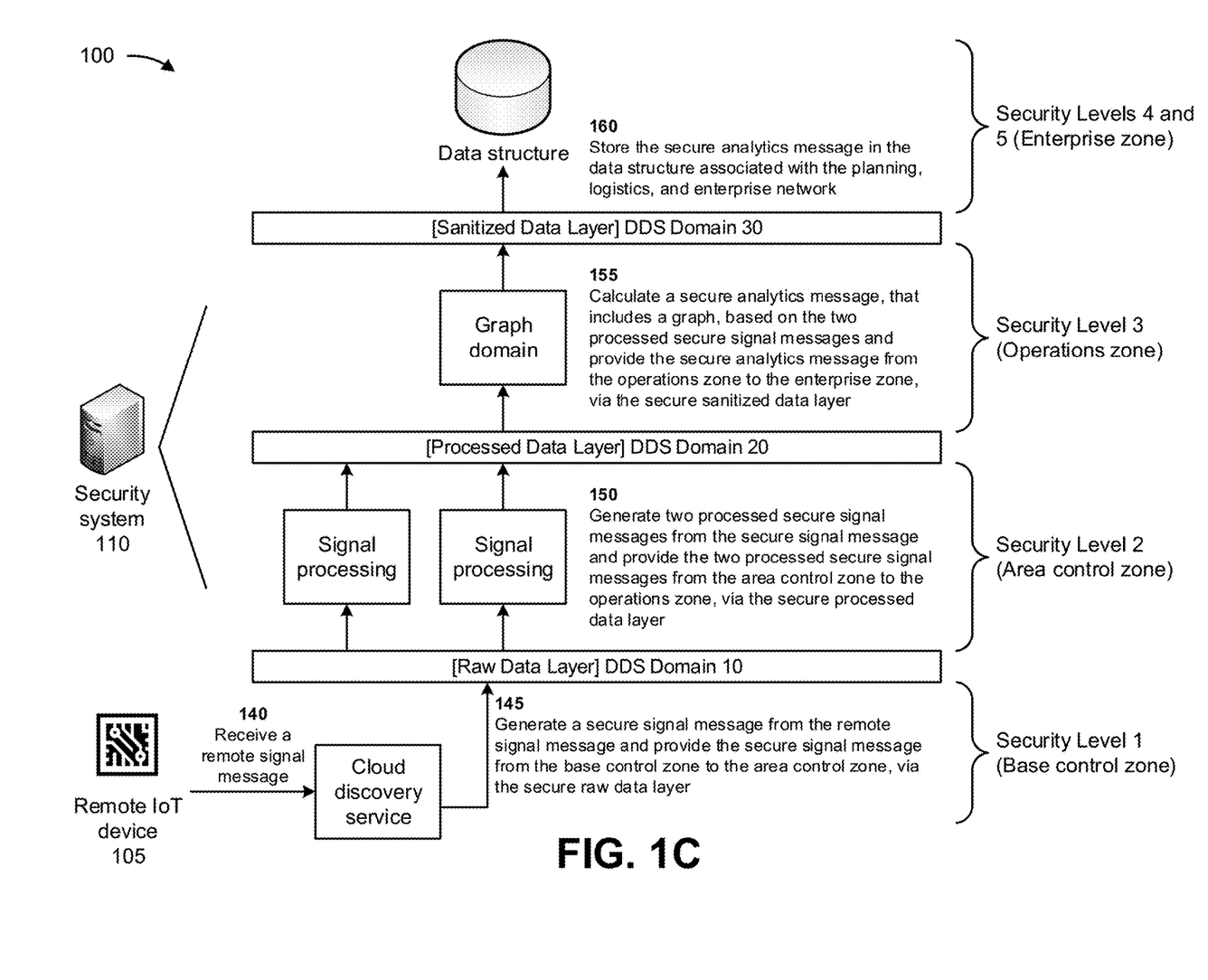

As shown in FIG. 1C, and by reference number 140, the security system 110 may receive a remote signal message from the remote IoT device 105. For example, the security system 110 may include a cloud discovery service to bridge remote data (e.g., external to the security system 110) with the DDS environment of the security system 110. The remote IoT device 105 and the cloud discovery service may be located in the base control zone (e.g., the first security zone or level zero of a cybersecurity standard). The remote IoT devices 105 may provide the remote signal message (e.g., a sensor reading, a temperature reading, a video, an image, audio, and/or the like) to the cloud discovery service, and the cloud discovery service may receive the remote signal message from the remote IoT device 105.

As further shown in FIG. 1C, and by reference number 145, the security system 110 may generate a secure signal message from the remote signal message and may provide the secure signal message from the base control zone to the area control zone via the secure raw data layer. For example, the cloud discovery service may convert the remote signal message into a DDS type (e.g., defined by the IDL) to generate the secure signal message. The cloud discovery service may provide the secure signal message from the base control zone to the area control zone (e.g., the second security zone or level one of the cybersecurity standard) via the secure raw data layer (e.g., the first secure data layer).

As further shown in FIG. 1C, and by reference number 150, the security system 110 may generate two processed secure signal messages from the secure signal message and may provide the two processed secure signal messages from the area control zone to the operations zone via the secure processed data layer. For example, the signal processing components of the area control zone may process the secure signal message, by encoding the secure signal message in a new DDS data type, to generate the two processed secure signal messages. The signal processing components may provide the two processed secure signal messages from the area control zone to the operations zone (e.g., the third security zone or level two of the cybersecurity standard) via the secure processed data layer (e.g., the second secure data layer).

As further shown in FIG. 1C, and by reference number 155, the security system 110 may calculate a secure analytics message, that includes a graph, based on the two processed secure signal messages, and may provide the secure analytics message from the operations zone to the enterprise zone via the secure sanitized data layer. For example, the graph domain of the operations zone may read the two processed secure signal messages, and may map the two processed secure signal messages to a predefined facility map modeled as graph nodes and edges, to calculate the secure analytics message with the graph. The graph may be generated via the extension to the IndoorGML, specification that models physical spaces, objects, and abstract signal data as spaces and states. The graph domain may provide the secure analytics message from the operations zone to the enterprise zone (e.g., the fourth security zone or levels four and five of the cybersecurity standard) via the secure sanitized data layer (e.g., the third secure data layer).

As further shown in FIG. 1C, and by reference number 160, the security system 110 may store the secure analytics message in the data structure associated with the planning, logistics, and enterprise network. For example, the security system 110 may be associated with a secure data structure of an entity (e.g., a manufacturer, a government agency, and/or the like) responsible for the remote IoT device 105. The secure data structure may be associated with a planning, logistics, and enterprise network of the entity. The enterprise zone may also be associated with the secure data structure. The third secure data layer of the security system 110 may write the secure analytics message to the secure data structure so that the secure analytics message may be securely stored and utilized by the entity (e.g., for planning, logistics, and/or the like).

Figure 1D:
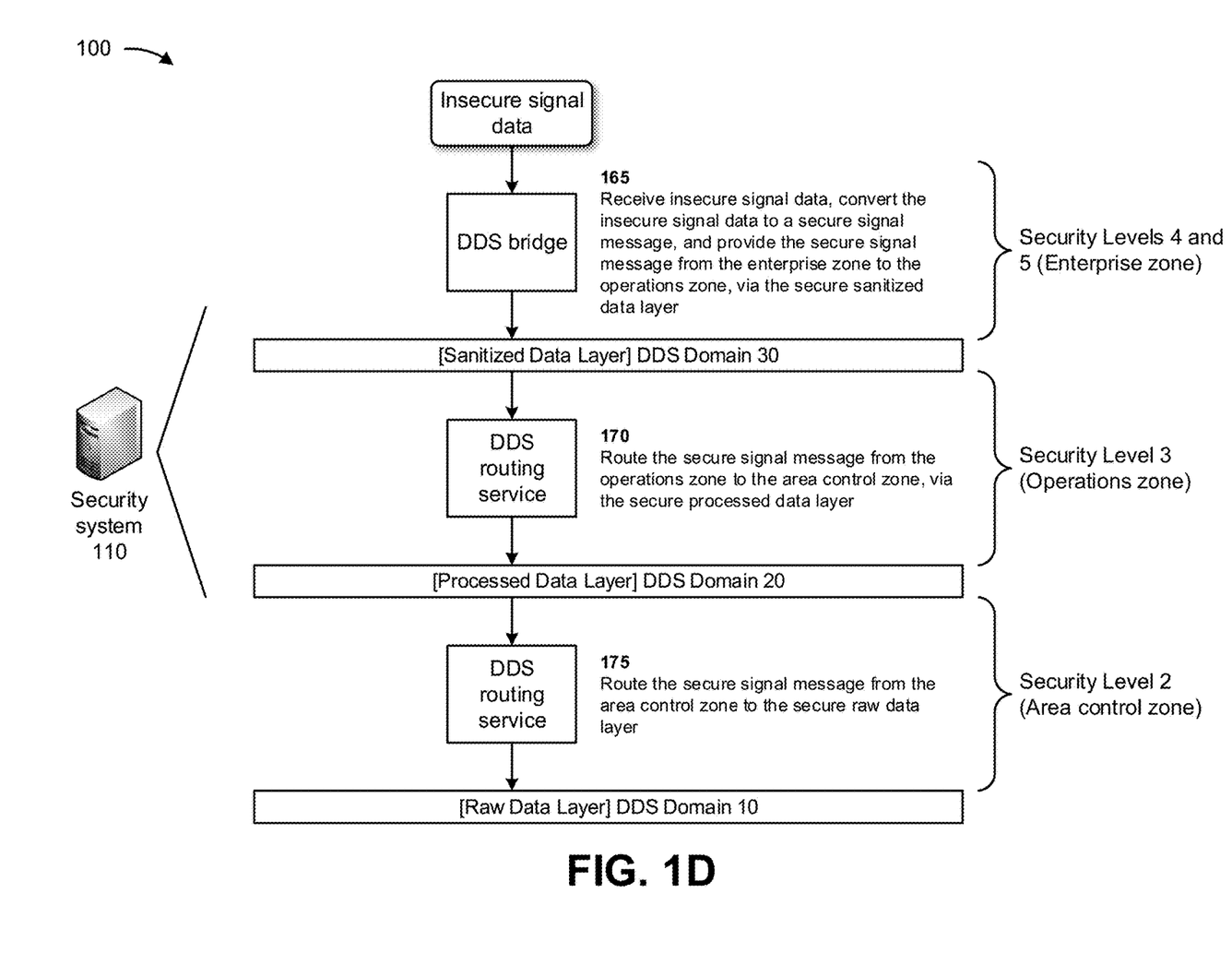

As shown in FIG. 1D, and by reference number 165, the security system 110 may receive insecure signal data, may convert the insecure signal data to a secure signal message, and may provide the secure signal message from the enterprise zone to the operations zone, via the secure sanitized data layer. For example, the security system 110 may include a DDS bridge provided in the enterprise zone. The DDS bridge may receive the insecure signal data (e.g., from a system external to the security system 110), and may inspect and convert the insecure signal data to an appropriate DDS data type message (e.g., the secure signal message). The DDS bridge may provide the secure signal message to the operations zone (e.g., the third security zone or level two of the cybersecurity standard) via the secure sanitized data layer (e.g., the third secure data layer).

As further shown in FIG. 1D, and by reference number 170, the security system 110 may route the secure signal message from the operations zone to the area control zone, via the secure processed data layer. For example, the security system 110 may include a DDS routing service provided in the operations zone. The DDS routing service may route the secure signal message from the operations zone to the area control zone (e.g., the second security zone or level one of the cybersecurity standard), via the secure processed data layer (e.g., the second secure data layer).

As further shown in FIG. 1D, and by reference number 175, the security system 110 may route the secure signal message from the area control zone to the secure raw data layer. For example, the security system 110 may include a DDS routing service provided in the area control zone. The DDS routing service may route the secure signal message from the area control zone to the secure raw data layer (e.g., the first secure data layer).

Figure 1E:
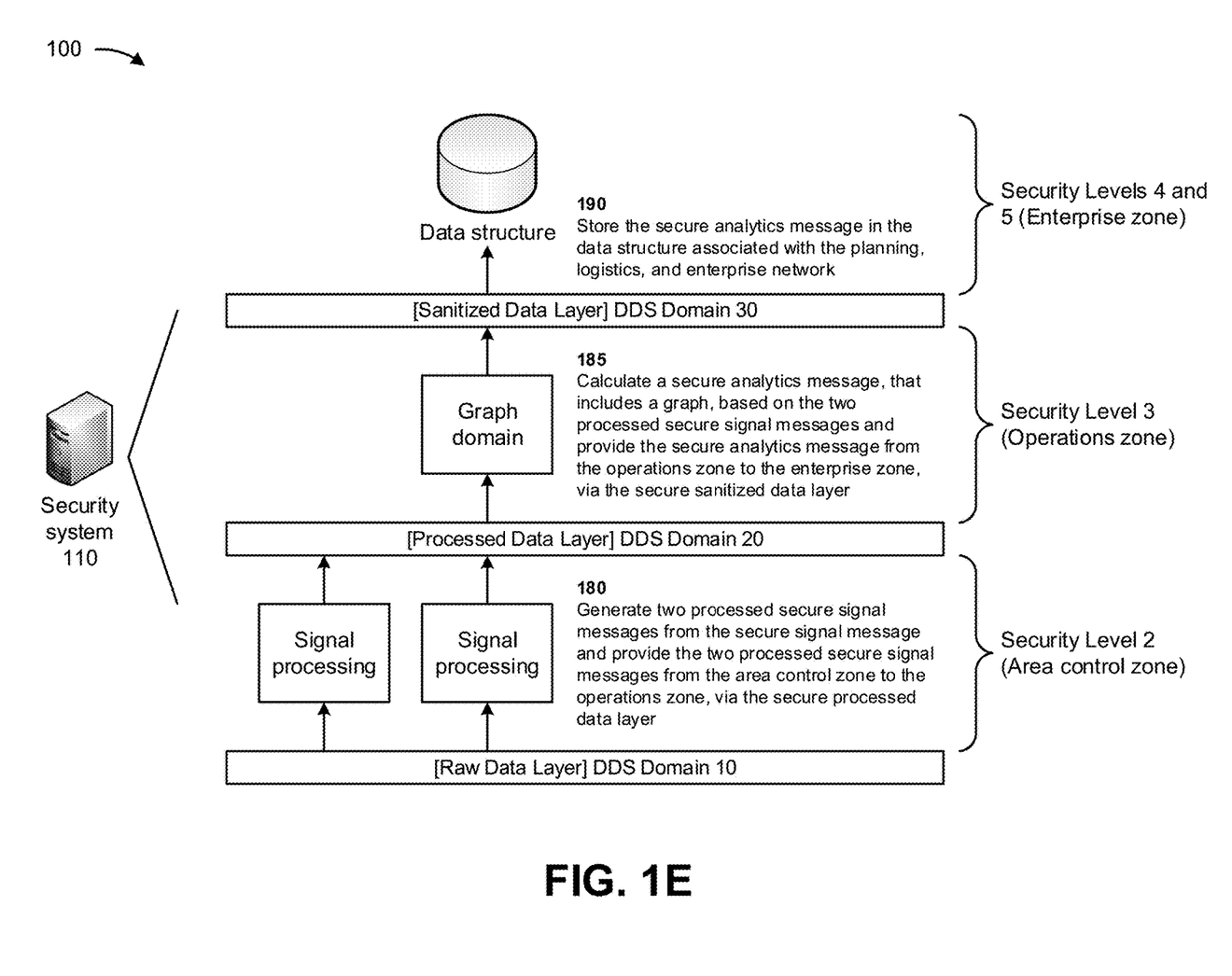

As shown in FIG. 1E, and by reference number 180, the security system 110 may generate two processed secure signal messages from the secure signal message and may provide the two processed secure signal messages from the area control zone to the operations zone via the secure processed data layer. For example, the signal processing components of the area control zone may process the secure signal message, by encoding the secure signal message in a new DDS data type, to generate the two processed secure signal messages. The signal processing components may provide the two processed secure signal messages from the area control zone to the operations zone (e.g., the third security zone or level two of the cybersecurity standard) via the secure processed data layer (e.g., the second secure data layer).

As further shown in FIG. 1E, and by reference number 185, the security system 110 may calculate a secure analytics message, that includes a graph, based on the two processed secure signal messages and may provide the secure analytics message from the operations zone to the enterprise zone via the secure sanitized data layer. For example, the graph domain of the operations zone may read the two processed secure signal messages, and may map the two processed secure signal messages to a predefined facility map modeled as graph nodes and edges, to calculate the secure analytics message with the graph. The graph may be generated via the extension to the IndoorGML, specification that models physical spaces, objects, and abstract signal data as spaces and states. The graph domain may provide the secure analytics message from the operations zone to the enterprise zone (e.g., the fourth security zone or levels four and five of the cybersecurity standard) via the secure sanitized data layer (e.g., the third secure data layer).

As further shown in FIG. 1E, and by reference number 190, the security system 110 may store the secure analytics message in the data structure associated with the planning, logistics, and enterprise network. For example, the security system 110 may be associated with a secure data structure of an entity (e.g., a manufacturer, a government agency, and/or the like) responsible for the insecure signal data. The secure data structure may be associated with a planning, logistics, and enterprise network of the entity. The enterprise zone may also be associated with the secure data structure. The third secure data layer of the security system 110 may write the secure analytics message to the secure data structure so that the secure analytics message may be securely stored and utilized by the entity (e.g., for planning, logistics, and/or the like).

In this way, the security system 110 generates secure signals based on IoT device signals. For example, the security system 110 may securely handle IoT device signals in accordance with a security standard (e.g., an IEC-62443 cybersecurity standard) and may enable control of and data collection from the IoT devices 105 in near real-time. The security system 110 may collect signal data of any type from the IoT devices 105 and may create a data structure for storing the signal data for analytical processing. The security system 110 may provide a layered, event-driven system design that includes security zones bounded by secure devices (e.g., firewall devices). Thus, the security system 110 may conserve computing resources, networking resources, and/or other resources that would have otherwise been consumed by exposing sensitive data to security risks, handling security breaches associated with sensitive data, recovering sensitive data lost in security breaches, losing opportunities that data analytics provide for improving processes, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
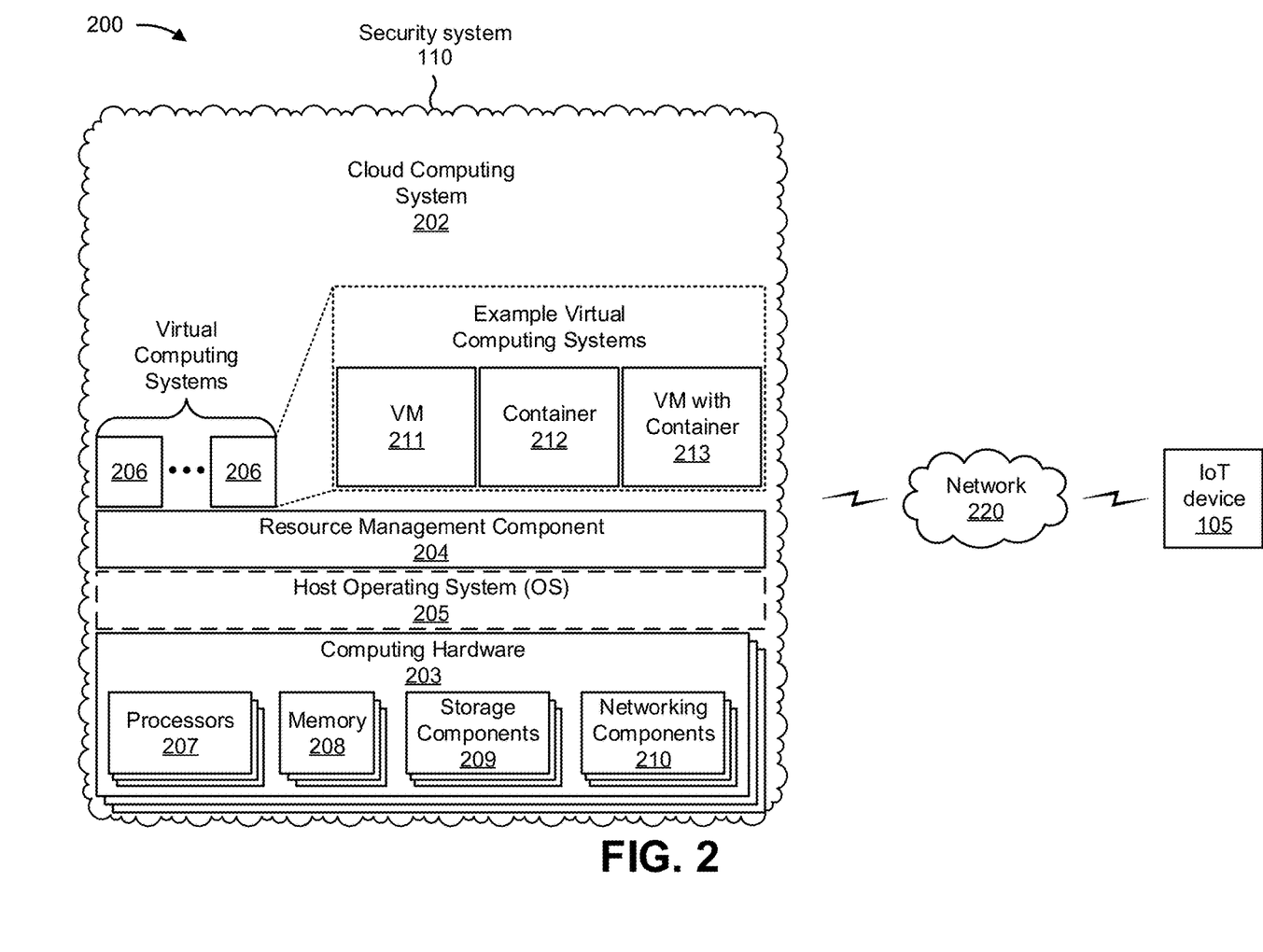
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the security system 110, which may include one or more elements of and/or may execute within a cloud computing system 202. The cloud computing system 202 may include one or more elements 203-213, as described in more detail below. As further shown in FIG. 2, environment 200 may include the IoT device 105 and/or a network 220. Devices and/or elements of environment 200 may interconnect via wired connections and/or wireless connections.

The IoT device 105 includes one or more devices capable of receiving, generating, storing, processing, and/or providing information, as described elsewhere herein. The IoT device 105 may include a communication device. For example, the IoT device 105 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), a video camera, a meter, a sensor, a connected vehicle, a tracker, an alarm panel, a manufacturing control system, or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the security system 110 may include one or more elements 203-213 of the cloud computing system 202, may execute within the cloud computing system 202, and/or may be hosted within the cloud computing system 202, in some implementations, the security system 110 may not be cloud-based (e.g., may be implemented outside of a cloud computing system) or may be partially cloud-based. For example, the security system 110 may include one or more devices that are not part of the cloud computing system 202, such as the device 300 of FIG. 3, which may include a standalone server or another type of computing device. The security system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
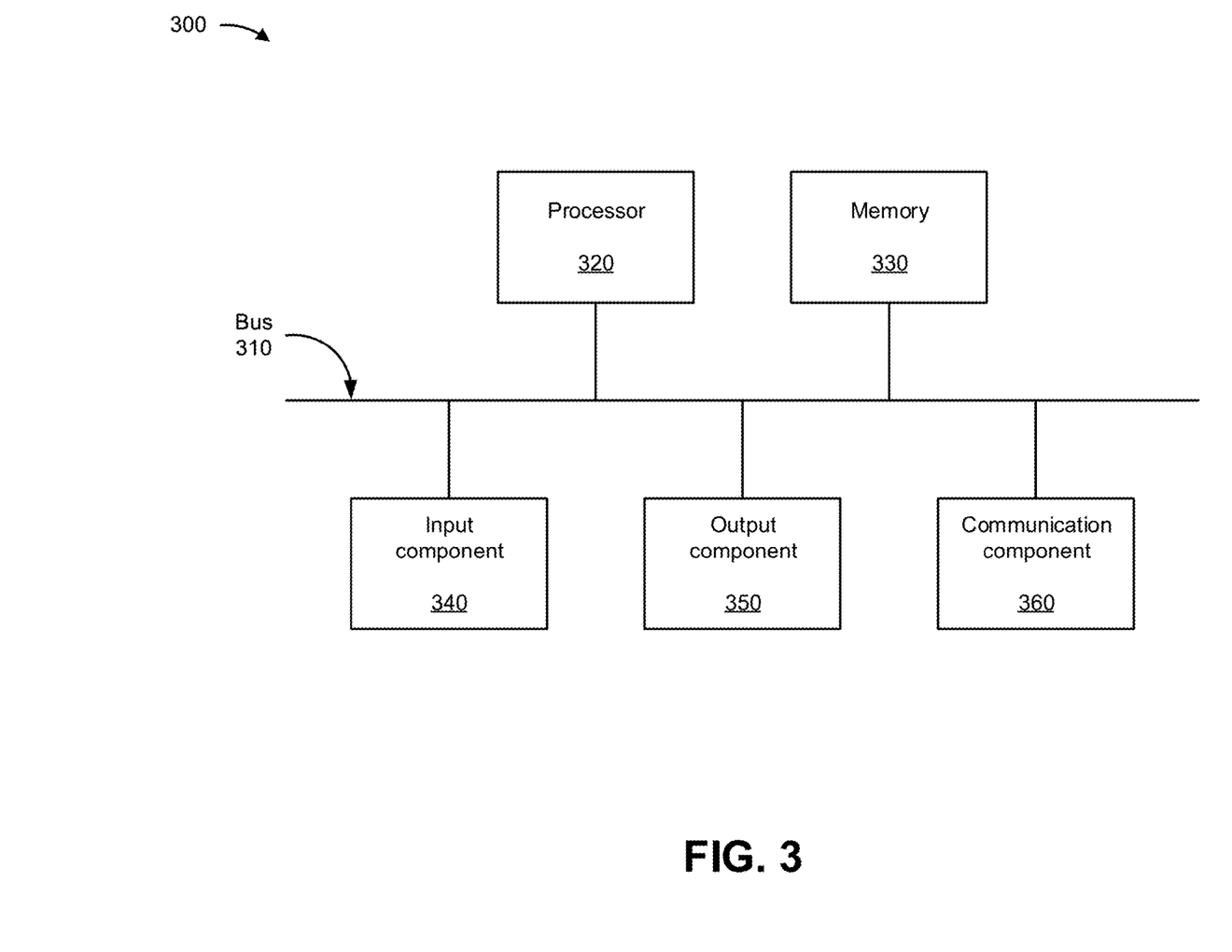
FIG. 3 is a diagram of example components of one or more devices of FIG. 2.

FIG. 3 is a diagram of example components of a device 300, which may correspond to the IoT device 105 and/or the security system 110. In some implementations, the IoT device 105 and/or the security system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
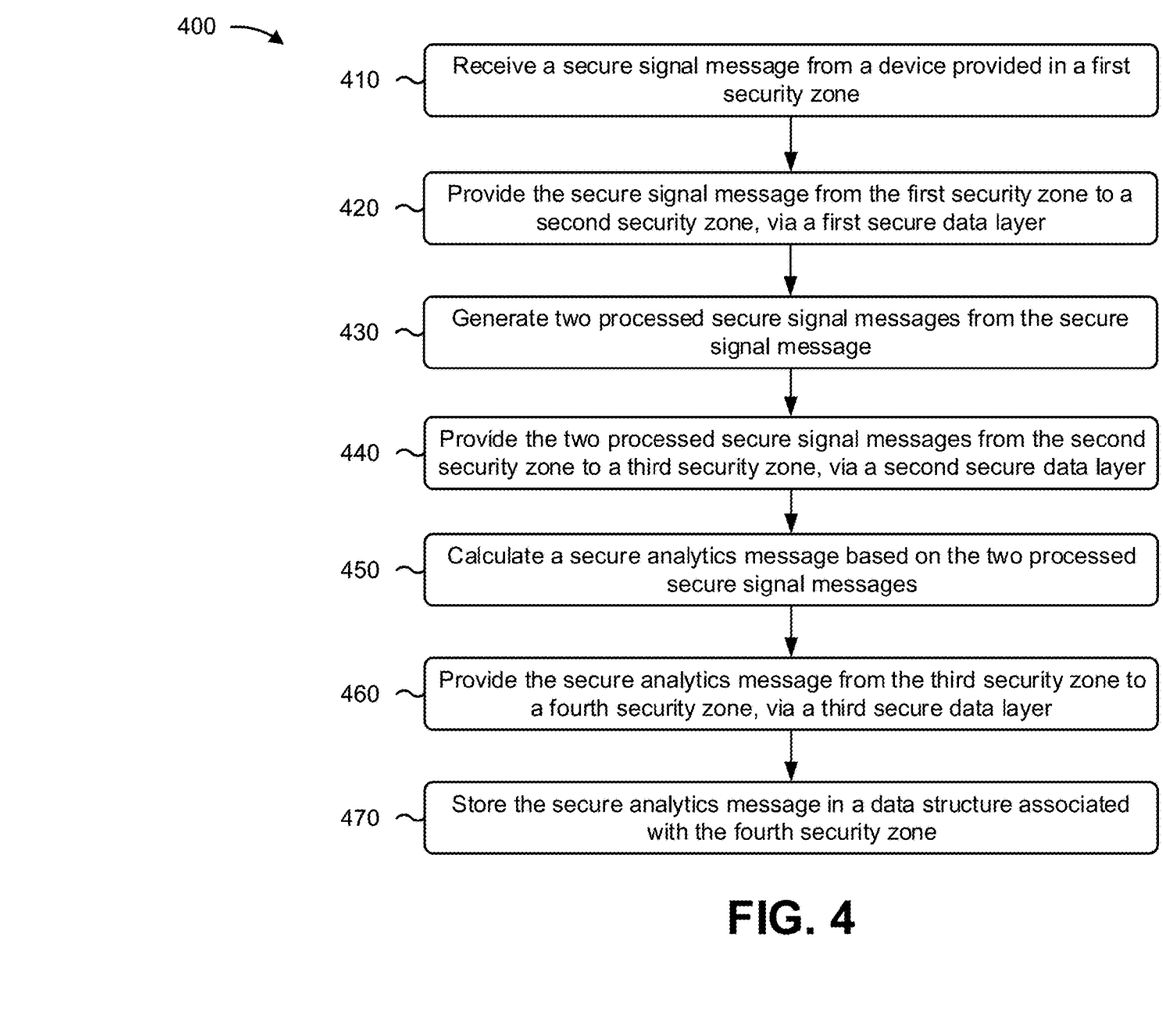
FIG. 4 is a flowchart of an example process for generating secure signals based on IoT device signals in accordance with embodiments described herein.

FIG. 4 is a flowchart of an example process 400 for generating secure signals based on IoT device signals. In some implementations, one or more process blocks of FIG. 4 may be performed by a device (e.g., the security system 110). In some implementations, one or more process blocks of FIG. 4 may be performed by another device or a group of devices separate from or including the device, such as an IoT device (e.g., the IoT device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a secure signal message from an IoT device provided in a first security zone (block 410). For example, the device may receive a secure signal message from an IoT device provided in a first security zone, as described above. In some implementations, receiving the secure signal message from the IoT device provided in the first security zone includes receiving the secure signal message from a domain distribution service publisher associated with the IoT device.

As further shown in FIG. 4, process 400 may include providing the secure signal message from the first security zone to a second security zone, via a first secure data layer (block 420). For example, the device may provide the secure signal message from the first security zone to a second security zone, via a first secure data layer, as described above.

As further shown in FIG. 4, process 400 may include generating two processed secure signal messages from the secure signal message (block 430). For example, the device may generate two processed secure signal messages from the secure signal message, as described above. In some implementations, generating the two processed secure signal messages from the secure signal message includes processing the secure signal message to generate two processed signal messages, and encoding the two processed signal messages, based on a domain distribution service, to generate the two processed secure signal messages.

As further shown in FIG. 4, process 400 may include providing the two processed secure signal messages from the second security zone to a third security zone, via a second secure data layer (block 440). For example, the device may provide the two processed secure signal messages from the second security zone to a third security zone, via a second secure data layer, as described above.

As further shown in FIG. 4, process 400 may include calculating a secure analytics message, that includes a graph, based on the two processed secure signal messages (block 450). For example, the device may calculate a secure analytics message, that includes a graph, based on the two processed secure signal messages, as described above. In some implementations, calculating the secure analytics message, that includes the graph, based on the two processed secure signal messages includes mapping the two processed secure signal messages to one or more nodes and one or more edges of the graph, and encoding the graph, based on a domain distribution service, to calculate the secure analytics messages. In some implementations, the graph includes spaces and states that model physical spaces, physical objects, and signal data.

As further shown in FIG. 4, process 400 may include providing the secure analytics message from the third security zone to a fourth security zone, via a third secure data layer (block 460). For example, the device may provide the secure analytics message from the third security zone to a fourth security zone, via a third secure data layer, as described above. In some implementations, the first security zone, the second security zone, the third security zone, the fourth security zone, the first secure data layer, the second secure data layer, and the third secure data layer are associated with a particular cybersecurity standard.

As further shown in FIG. 4, process 400 may include storing the secure analytics message in a data structure associated with the fourth security zone (block 470). For example, the device may store the secure analytics message in a data structure associated with the fourth security zone, as described above. In some implementations, storing the secure analytics message in the data structure associated with the fourth security zone includes utilizing a domain distribution service bridge to store the secure analytics message in the data structure associated with the fourth security zone.

In some implementations, process 400 includes receiving a remote signal message; generating another secure signal message from the remote signal message; providing the other secure signal message from the first security zone to the second security zone, via the first secure data layer; generating another two processed secure signal messages from the other secure signal message; providing the other two processed secure signal messages from the second security zone to the third security zone, via the second secure data layer; calculating another secure analytics message, that includes another graph, based on the other two processed secure signal messages; providing the other secure analytics message from the third security zone to the fourth security zone, via the third secure data layer; and storing the other secure analytics message in the data structure associated with the fourth security zone.

In some implementations, process 400 includes receiving insecure signal data; converting the insecure signal data to another secure signal message; providing the other secure signal message from the fourth security zone to the third security zone, via the third secure data layer; routing the other secure signal message from the third security zone to the second security zone, via the second secure data layer; and routing the other secure signal message from the second security zone to the first secure data layer.

In some implementations, process 400 includes generating another two processed secure signal messages from the other secure signal message; providing the other two processed secure signal messages from the second security zone to the third security zone, via the second secure data layer; calculating another secure analytics message, that includes another graph, based on the other two processed secure signal messages; providing the other secure analytics message from the third security zone to the fourth security zone, via the third secure data layer; and storing the other secure analytics message in the data structure associated with the fourth security zone.

In some implementations, converting the insecure signal data to the other secure signal message includes utilizing a domain distribution service bridge to convert the insecure signal data to the other secure signal message. In some implementations, routing the other secure signal message from the third security zone to the second security zone, via the second secure data layer includes utilizing a domain distribution service routing service to route the other secure signal message from the third security zone to the second security zone, via the second secure data layer. In some implementations, routing the other secure signal message from the second security zone to the first secure data layer includes utilizing a domain distribution service routing service to route the other secure signal message from the second security zone to the first secure data layer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a secure signal message from an Internet of Things device provided in a first security zone;
   providing, by the device, the secure signal message from the first security zone to a second security zone, via a raw data layer;
   generating, by the device, two processed secure signal messages from the secure signal message;
   providing, by the device, the two processed secure signal messages from the second security zone to a third security zone, via a processed data layer;
   calculating, by the device, a secure analytics message, that includes a graph, based on the two processed secure signal messages;
   providing, by the device, the secure analytics message from the third security zone to a fourth security zone, via a sanitized data layer; and
   storing, by the device, the secure analytics message in a data structure associated with the fourth security zone.

2. The method of claim 1, further comprising:
   receiving a remote signal message;
   generating another secure signal message from the remote signal message;
   providing the other secure signal message from the first security zone to the second security zone, via the raw data layer;
   generating another two processed secure signal messages from the other secure signal message;
   providing the other two processed secure signal messages from the second security zone to the third security zone, via the processed data layer;
   calculating another secure analytics message, that includes another graph, based on the other two processed secure signal messages;
   providing the other secure analytics message from the third security zone to the fourth security zone, via the sanitized data layer; and
   storing the other secure analytics message in the data structure associated with the fourth security zone.

3. The method of claim 1, further comprising:
   receiving insecure signal data;
   converting the insecure signal data to another secure signal message;
   providing the other secure signal message from the fourth security zone to the third security zone, via the sanitized data layer;
   routing the other secure signal message from the third security zone to the second security zone, via the processed data layer; and
   routing the other secure signal message from the second security zone to the raw data layer.

4. The method of claim 3, further comprising:
   generating another two processed secure signal messages from the other secure signal message;
   providing the other two processed secure signal messages from the second security zone to the third security zone, via the processed data layer;
   calculating another secure analytics message, that includes another graph, based on the other two processed secure signal messages;
   providing the other secure analytics message from the third security zone to the fourth security zone, via the sanitized data layer; and
   storing the other secure analytics message in the data structure associated with the fourth security zone.

5. The method of claim 3, wherein converting the insecure signal data to the other secure signal message comprises:
   utilizing a domain distribution service bridge to convert the insecure signal data to the other secure signal message.

6. The method of claim 3, wherein routing the other secure signal message from the third security zone to the second security zone, via the processed data layer comprises:
   utilizing a domain distribution service routing service to route the other secure signal message from the third security zone to the second security zone, via the processed data layer.

7. The method of claim 3, wherein routing the other secure signal message from the second security zone to the raw data layer comprises:
   utilizing a domain distribution service routing service to route the other secure signal message from the second security zone to the raw data layer.

8. A device, comprising:
   one or more processors configured to:
   receive a secure signal message from an Internet of Things device provided in a first security zone;

provide the secure signal message from the first security zone to a second security zone, via a first secure data layer;
generate two processed secure signal messages from the secure signal message;
provide the two processed secure signal messages from the second security zone to a third security zone, via a second secure data layer;
calculate a secure analytics message, that includes a graph, based on the two processed secure signal messages;
provide the secure analytics message from the third security zone to a fourth security zone, via a third secure data layer;
store the secure analytics message in a data structure associated with the fourth security zone;
receive a remote signal message;
generate another secure signal message from the remote signal message;
provide the other secure signal message from the first security zone to the second security zone, via the first secure data layer;
generate another two processed secure signal messages from the other secure signal message;
provide the other two processed secure signal messages from the second security zone to the third security zone, via the second secure data layer;
calculate another secure analytics message based on the other two processed secure signal messages;
provide the other secure analytics message from the third security zone to the fourth security zone, via the third secure data layer; and
store the other secure analytics message in the data structure.

9. The device of claim 8, wherein the one or more processors, to receive the secure signal message from the Internet of Things device provided in the first security zone, are configured to:
receive the secure signal message from a domain distribution service publisher associated with the Internet of Things device.

10. The device of claim 8, wherein the first security zone, the second security zone, the third security zone, the fourth security zone, the first secure data layer, the second secure data layer, and the third secure data layer are associated with a particular cybersecurity standard.

11. The device of claim 8, wherein the one or more processors, to generate the two processed secure signal messages from the secure signal message, are configured to:
process the secure signal message to generate two processed signal messages; and
encode the two processed signal messages, based on a domain distribution service, to generate the two processed secure signal messages.

12. The device of claim 8, wherein the one or more processors, to calculate the secure analytics message, that includes the graph, based on the two processed secure signal messages comprises:
map the two processed secure signal messages to one or more nodes and one or more edges of the graph; and
encode the graph, based on a domain distribution service, to calculate the secure analytics message.

13. The device of claim 8, wherein the one or more processors, to store the secure analytics message in the data structure associated with the fourth security zone, are configured to:

utilize a domain distribution service bridge to store the secure analytics message in the data structure associated with the fourth security zone.

14. The device of claim 8, wherein the graph includes spaces and states that model physical spaces, physical objects, and signal data.

15. A non-transitory computer-readable medium storing a set of instructions, the set of instructions comprising:
one or more instructions that, when executed by one or more processors of a device, cause the device to:
receive a secure signal message from an Internet of Things device provided in a first security zone;
provide the secure signal message from the first security zone to a second security zone, via a first secure data layer;
generate two processed secure signal messages from the secure signal message;
provide the two processed secure signal messages from the second security zone to a third security zone, via a second secure data layer;
calculate a secure analytics message, that includes a graph, based on the two processed secure signal messages;
provide the secure analytics message from the third security zone to a fourth security zone, via a third secure data layer,
wherein the first security zone, the second security zone, the third security zone, the fourth security zone, the first secure data layer, the second secure data layer, and the third secure data layer are associated with a particular cybersecurity standard;
store the secure analytics message in a data structure associated with the fourth security zone;
receive insecure signal data;
convert the insecure signal data to another secure signal message;
provide the other secure signal message from the fourth security zone to the third security zone, via the third secure data layer;
route the other secure signal message from the third security zone to the second security zone, via the second secure data layer; and
route the other secure signal message from the second security zone to the first secure data layer.

16. The non-transitory computer-readable medium of claim 15, wherein the one or more instructions further cause the device to:
generate another two processed secure signal messages from the other secure signal message;
provide the other two processed secure signal messages from the second security zone to the third security zone, via the second secure data layer;
calculate another secure analytics message, that includes another graph, based on the other two processed secure signal messages;
provide the other secure analytics message from the third security zone to the fourth security zone, via the third secure data layer; and
store the other secure analytics message in the data structure associated with the fourth security zone.

17. The non-transitory computer-readable medium of claim 15, wherein the one or more instructions, that cause the device to generate the two processed secure signal messages from the secure signal message, cause the device to:

process the secure signal message to generate two processed signal messages; and encode the two processed signal messages, based on a domain distribution service, to generate the two processed secure signal messages.

18. The non-transitory computer-readable medium of claim 15, wherein the one or more instructions, that cause the device to calculate the secure analytics message, that, cause the device to the graph, based on the two processed secure signal messages comprises:

map the two processed secure signal messages to one or more nodes and one or more edges of the graph; and encode the graph, based on a domain distribution service, to calculate the secure analytics message.

19. The method of claim 1, wherein:

the first security zone is a base control zone;

the second security zone is an area control zone;

the third security zone is an operations zone; and the fourth security zone is an enterprise zone.

20. The method of claim 19, wherein:

the area control zone includes two or more identical signal processing components for each signal type received from the base control zone;

the operations zone includes a graph domain that generates the graph based on the two processed secure signal messages; and the enterprise zone is responsible for storing the secure analytics message in a secure data structure.

* * * * *